United States Patent
Moon et al.

(10) Patent No.: US 10,615,700 B1
(45) Date of Patent: Apr. 7, 2020

(54) SYNCHRONOUS RECTIFIER CONTROL FOR SWITCHED MODE POWER SUPPLIES AND METHOD THEREFOR

(71) Applicant: SEMICONDUCTOR COMPONENTS INDUSTRIES, LLC, Phoenix, AZ (US)

(72) Inventors: Sangcheol Moon, Bucheon-si (KR); JooHoon Kim, Bucheon-si (KR); Inki Park, Seoul (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/252,836

(22) Filed: Jan. 21, 2019

(51) Int. Cl.
*H02M 3/335* (2006.01)
*H02M 1/38* (2007.01)
*H02M 1/00* (2006.01)

(52) U.S. Cl.
CPC ......... *H02M 3/33592* (2013.01); *H02M 1/38* (2013.01); *H02M 2001/0038* (2013.01)

(58) Field of Classification Search
CPC ........... H02M 2001/0038; H02M 1/38; H02M 3/33592
See application file for complete search history.

(56) References Cited

U.S. PATENT DOCUMENTS

| | | | | |
|---|---|---|---|---|
| 2010/0124086 A1* | 5/2010 | Chen | ................. | H02M 3/33592 363/127 |
| 2014/0376272 A1* | 12/2014 | Miao | ................. | H02M 3/33592 363/21.02 |
| 2015/0124494 A1* | 5/2015 | Malinin | ............ | H02M 3/33592 363/21.14 |
| 2015/0229223 A1* | 8/2015 | Cao | ................... | H02M 3/33515 363/21.13 |
| 2016/0190942 A1* | 6/2016 | Kikuchi | ............ | H02M 3/33507 363/21.14 |

(Continued)

OTHER PUBLICATIONS

AND9408/D; "Basic Principles of LLC Resonant Half Bridge Converter and DC/Dynamic Circuit Simulation Examples"; Product Data Sheet; ON Semiconductor; Apr. 2016; 9 pages; Rev. 0; ON Semiconductor; 5005 E. McDowell Road; Phoenix, AZ 85008; United States.

(Continued)

*Primary Examiner* — Fred E Finch, III
(74) *Attorney, Agent, or Firm* — Polansky & Associates, P.L.L.C.; Paul J. Polansky

(57) ABSTRACT

A power converter includes a transformer, a first primary side transistor coupled to the primary winding, a primary side controller that provides a gate signal to a gate of the first primary side transistor, a first synchronous rectifier (SR) transistor, and an SR controller. The first SR transistor has a drain coupled to a secondary winding of the transformer, a gate for receiving a first SR gate signal, and a source coupled to a first output terminal of the power converter. The SR controller is coupled to the gate and drain of the first SR transistor, for activating the first SR gate signal when a voltage on the drain falls below a turn-on threshold, and deactivating the first SR gate signal when a voltage on the drain rises above a variable turn-off threshold, wherein the variable turn-off threshold increases over an expected on-time of the first SR gate signal.

27 Claims, 9 Drawing Sheets

(56) References Cited

U.S. PATENT DOCUMENTS

| | | | | |
|---|---|---|---|---|
| 2016/0294298 A1* | 10/2016 | Wong | ............... | H02M 3/33592 |
| 2016/0373019 A1* | 12/2016 | Hsu | .................. | H02M 3/33592 |
| 2017/0040904 A1* | 2/2017 | Kikuchi | ................. | H02M 1/08 |
| 2017/0222569 A1* | 8/2017 | Choi | ..................... | H02M 1/088 |
| 2017/0317598 A1* | 11/2017 | Ptacek | ............. | H02M 3/33523 |
| 2018/0013352 A1* | 1/2018 | Cao | .................. | H02M 3/33507 |
| 2018/0091040 A1* | 3/2018 | Wong | ..................... | H02M 1/08 |
| 2019/0165686 A1* | 5/2019 | Wang | ..................... | H02M 1/08 |
| 2019/0229634 A1* | 7/2019 | Moon | .................. | H02M 1/083 |

OTHER PUBLICATIONS

MP6924; "Fast Turn-off, CCM/DCM Compatible Dual LLC Synchronous Rectifier with low Sleep Mode Current" Product Data Sheet; Monolithic Power Systems; Feb. 2017; 14 pages; Rev. 1.01; Monolithic Power Systems, Inc.; 79 Great Oaks Blvd, San Jose, CA 95119; United States.

NCP4306; "Secondary Side Synchronous Rectification Driver for High Efficiency SMPS Topologies"; Product Data Sheet; Semiconductor Components Industries, LLC.; Dec. 2018; 56 pages; Rev. 5; Semiconductor Components Industries, LLC.; 5005 E. McDowell Road; Phoenix, AZ 85008; United States.

TEA1995T; "GreenChip dual synchronous rectifier controller"; Product Data Sheet; NXP Semiconductors; Dec. 2017; 18 pages; Rev. 3; NXP Semiconductors B.V.; High Tech Campus 60, 5656 AG, Eindhoven; The Netherlands.

\* cited by examiner

US 10,615,700 B1

SYNCHRONOUS RECTIFIER CONTROL FOR SWITCHED MODE POWER SUPPLIES AND METHOD THEREFOR

FIELD OF THE DISCLOSURE

The present disclosure relates generally to power conversion circuits, and more particularly to synchronous rectifiers for switched mode power supplies and the like.

BACKGROUND

Switched mode power supplies can be used to create a direct current (DC) voltage from a DC or an alternating current (AC) input voltage by switching current through an energy storage element such as a transformer. The duty cycle of the switching is controlled to regulate the output voltage to a desired level. The secondary side of the transformer is used to deliver power to a load at a regulated voltage. Typically, the switched mode power supply delivers power to an output capacitor and the load through a rectifier, which prevents reverse current flow when the power supply conducts current through the primary winding of the transformer.

The rectifier can take two forms. A passive rectifier, such as a diode, can be placed in series with the secondary winding to prevent reverse current flow. However the diode cannot properly prevent reverse current flow if the output power supply voltage exceeds the breakdown voltage of the diode. Moreover the diode causes a forward voltage drop when conductive, decreasing the efficiency of the converter. To solve these problems, another form of rectifier known as a synchronous rectifier is often used. A synchronous rectifier includes an active switch, typically an N-channel metal-oxide-semiconductor field effect transistor (MOSFET), connected in series with the secondary winding along with a controller that makes the transistor conductive at the appropriate time. Because the transistor can be biased fully on, synchronous rectifiers are generally more efficient than passive rectifiers.

Synchronous rectifiers compare the drain voltage to various thresholds to determine when the make the synchronous rectifier transistor conductive and non-conductive. To reduce dead time and achieve high efficiency, a higher turn-off threshold voltage is required. If stray inductance caused by the MOSFET package and the printed circuit board (PCB) pattern is large, a positive turn-off threshold shows much higher system efficiency with a small dead time. However, the positive turn-off threshold may induce late turn-off during a transient condition and lead to inversion currents and drain spiking. To prevent the late turn-off during transient conditions, the off-time threshold can be set to around zero volts or even to a negative value. However a zero or negative turn off threshold decreases system efficiency itself. Thus it has been difficult to simultaneously achieve both a small dead time while avoiding inversion currents and drain spiking during synchronous rectifier turn off.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
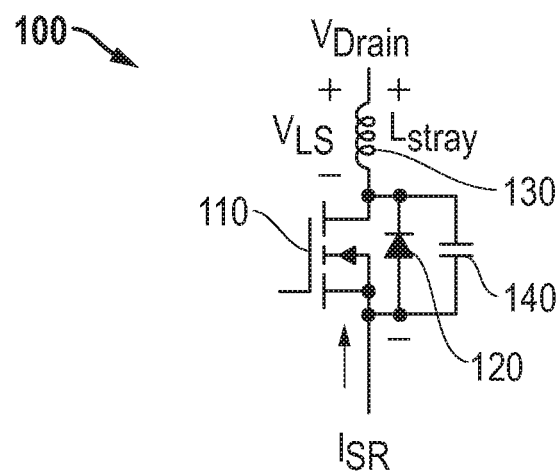
FIG. 1 illustrates in schematic form an electrical model of a synchronous rectifier transistor.

FIG. 1 illustrates in schematic form an electrical model 100 of a synchronous rectifier transistor. Electrical model 100 includes an N-channel MOSFET 110, a body diode 120, a parasitic inductor 130, and a parasitic capacitor 140. N-channel MOSFET 110 has a first source/drain terminal, a gate, a second source/drain terminal for receiving a current labeled "$I_{SR}$", and a bulk terminal connected to the second source/drain terminal. Body diode 120 is a PN junction diode having an anode connected to the second source/drain terminal of N-channel MOSFET 110, and a cathode connected to the first source/drain terminal of N-channel MOSFET 110. Parasitic inductor 130 has a first terminal for receiving a voltage labeled "$V_{DRAIN}$", a second terminal connected to the first source/drain terminal of N-channel MOSFET 110 and the cathode of body diode 120, and has an associated inductance labeled "$L_{STRAY}$". A voltage drop across inductor 130 is labeled "$V_{LS}$". Parasitic capacitor 140 has a first terminal connected to the first source/drain terminal of N-channel MOSFET 110 and the cathode of body diode 120, and a second terminal connected to the second source/drain terminal of N-channel MOSFET 110.

Figure 2:
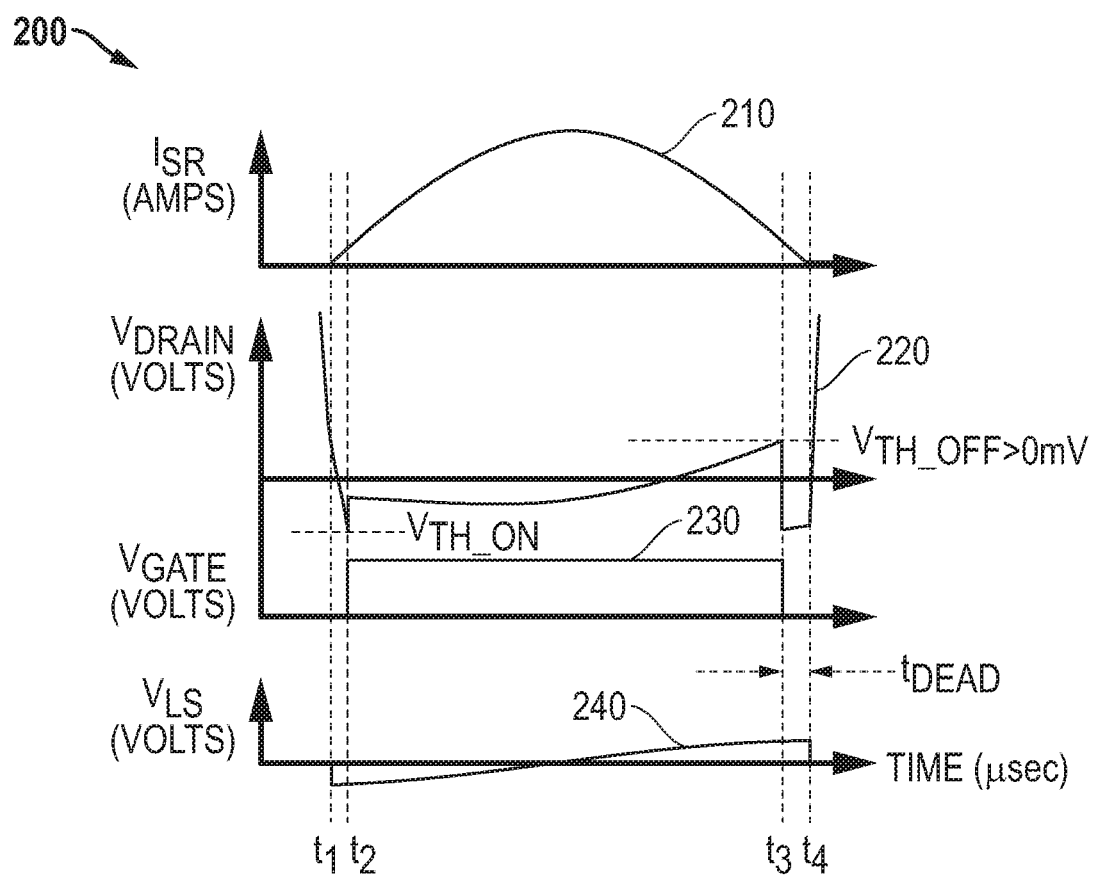
FIG. 2 illustrates a timing diagram of signals of the electrical model of FIG. 1 useful in understanding its operation.

FIG. 2 illustrates a timing diagram 200 of signals of electrical model 100 of FIG. 1 useful in understanding its operation. In timing diagram 200, the horizontal axis represents time in microseconds (μsec), and the vertical axis represents the magnitude of certain signals in respective units. Timing diagram 200 includes a waveform 210 of current $I_{SR}$ in amperes (amps), a waveform 220 of drain voltage $V_{DRAIN}$ in volts, a waveform of a gate voltage labeled "$V_{GATE}$", and a waveform 240 of inductor voltage $V_{LS}$ in volts. Timing diagram 200 also shows four time points of interest, including times labeled "$t_1$", "$t_2$", "$t_3$", and "$t_4$".

Before $t_1$, the synchronous rectifier is off. $V_{GATE}$ is at a low voltage, keeping N-channel MOSFET 110 non-conductive (the OFF state). No current flows through N-channel MOSFET 110 and body diode 120 is reverse biased. In a transformer-based system, due to the conduction of current through the primary winding, flux in the transformer induces a high voltage on the secondary winding, i.e. signal $V_{DRAIN}$. However when the primary side transistor is made non-conductive, $V_{DRAIN}$ falls until at time $t_1$, it reaches zero volts.

After time $t_1$, body diode 120 becomes forward biased, causing $V_{LS}$ to drop below zero volts and reducing $V_{DRAIN}$ below zero volts. When $V_{DRAIN}$ drops to a turn-on threshold labeled "$V_{TH\_ON}$", a synchronous rectifier controller activates $V_{GATE}$ at a high voltage, making N-channel MOSFET 110 conductive (the ON state) at $t_2$. N-channel MOSFET 110 is conductive with low ON resistance, and since most current flow through N-channel MOSFET 110, the voltage on the second terminal of parasitic inductor 130 jumps by an amount equal to the product of the magnitude of ISR and the ON resistance. At this point, $V_{DRAIN}$ follows $V_{LS}$ less a resistive (IR) drop determined by the magnitude of $I_{SR}$. Between $t_1$ and $t_4$, current $I_{SR}$ initially rises and then falls as the flux in the transformer is reduced by current flowing to the load.

At time $t_3$, $V_{DRAIN}$ reaches the turn-off threshold, labeled "$V_{TH\_OFF}$". When $V_{DRAIN}$ reaches $V_{TH\_OFF}$, the synchronous rectifier controller deactivates the $V_{GATE}$ signal to N-channel MOSFET 110. The voltage on $V_{DRAIN}$ drops due to the change of the current path from N-channel MOSFET 110 to body diode 120. Between times $t_3$ and $t_4$, $V_{DRAIN}$ rises slightly as the current through parasitic inductor 130 decreases.

At time $t_4$, the control loop on the primary side again makes the primary side transistor conductive. However the time between $t_3$ and $t_4$ defines a dead time, in which N-channel MOSFET 110 is not conductive. As can be seen from FIG. 2, as the turn-off threshold $V_{TH\_OFF}$ decreases, the dead time labeled "$t_{DEAD}$" increases, decreasing system efficiency.

Figure 3:
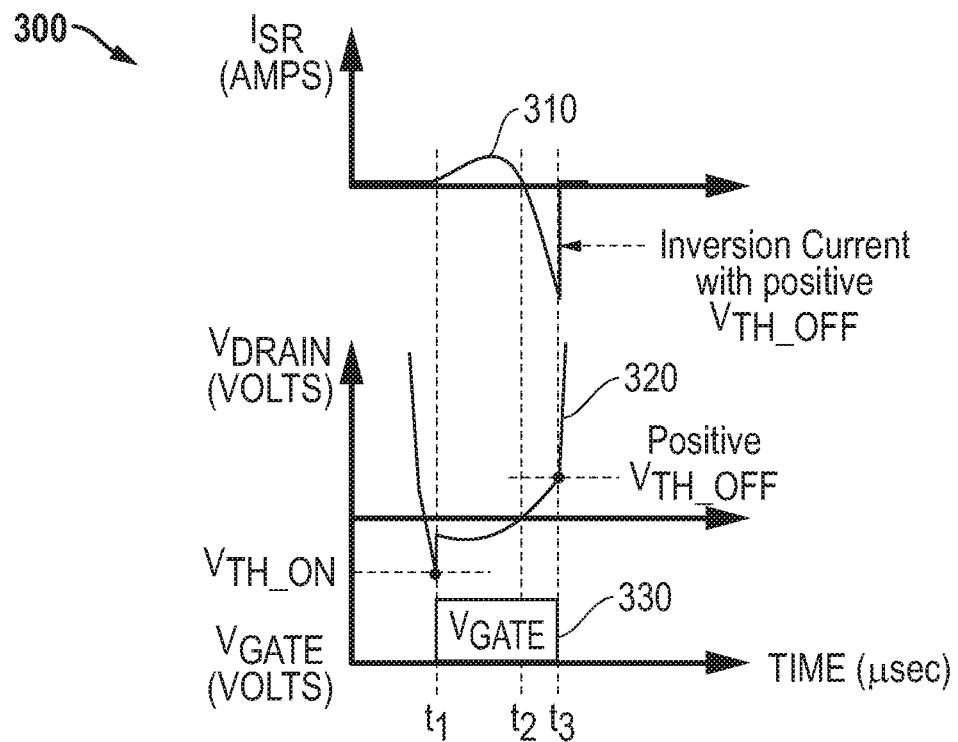
FIG. 3 illustrates a timing diagram showing the operation of the synchronous rectifier of FIG. 1 under light load conditions with a positive turn-off threshold.

FIG. 3 illustrates a timing diagram 300 showing the operation of the synchronous rectifier of FIG. 1 under light load conditions with a positive turn-off threshold. In timing diagram 300, the horizontal axis represents time in μsec, and the vertical axis represents the magnitude of certain signals in respective units. Timing diagram 300 illustrates a waveform 310 showing current $I_{SR}$ in amps, a waveform 320 showing drain voltage $V_{DRAIN}$ in volts, and a waveform 330 showing gate voltage $V_{GATE}$ in volts. Timing diagram 300 again shows three time points of interest, $t_1$, $t_2$, and $t_3$.

Timing diagram 300 shows that with a positive turn-off voltage ($V_{TH\_OFF}$>0), current $I_{SR}$ drops below zero, creating a relatively large inversion current that flows through parasitic inductor 130 and N-channel MOSFET 110 and reduces the efficiency of the converter. The primary side controller makes the primary side transistor conductive before $t_1$ and to $t_2$, while the synchronous rectifier controller activates N-channel MOSFET 110 between $t_1$ and $t_3$. The high turn-off threshold thus creates a large, undesirable current between $t_2$ and $t_3$.

Figure 4:
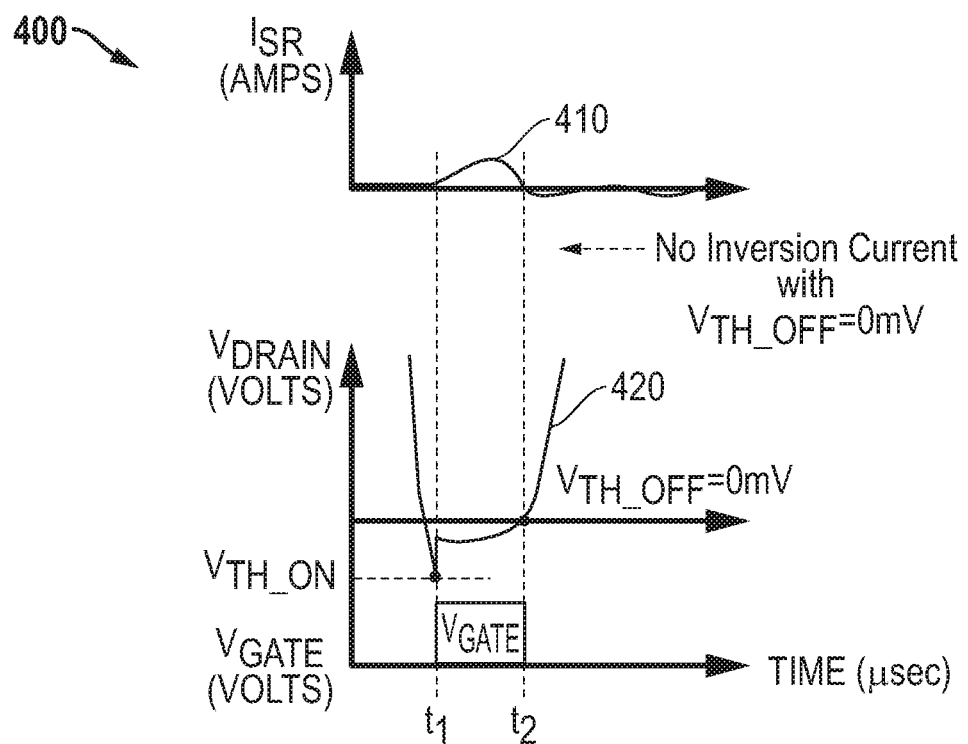
FIG. 4 illustrates a timing diagram showing the operation of the synchronous rectifier of FIG. 1 under light load conditions with a zero turn-off threshold.

FIG. 4 illustrates a timing diagram 400 showing the operation of the synchronous rectifier of FIG. 1 under light load conditions with a zero turn-off threshold. In timing diagram 400, the horizontal axis represents time in μsec, and the vertical axis represents the magnitude of various signals in respective units. Timing diagram 400 illustrates a waveform 410 showing current $I_{SR}$ in amps, a waveform 420 showing drain voltage $V_{DRAIN}$ in volts, and a waveform 430 showing gate voltage $V_{GATE}$ in volts. Timing diagram 400 shows two time points of interest, $t_1$ and $t_2$.

Timing diagram 400 shows that with zero turn-off voltage ($V_{TH\_OFF}{\approx}0$), then the current transient on $I_{SR}$ generally disappears. The primary side controller makes the primary side transistor conductive before $t_1$ and to $t_2$, while the synchronous rectifier controller activates N-channel MOSFET 110 between $t_1$ and $t_2$. With zero volt switching, there is substantially no dead time, and $V_{GATE}$ becomes inactive and the primary side switch becomes inactive at about the same time, namely $t_2$. There is no significant inversion current, but setting $V_{TH\_OFF}$ to zero causes large dead times as the load gets heavier, and this has lower efficiency at high loads.

According to the disclosed embodiments, a synchronous rectifier controller provides both high efficiency and little to no inversion current transients for light loads as well as heavy loads. As will be described in greater detail below, it does so by providing a multi-step turn off threshold that increases as the size of the load and length of the switching cycle increase.

Figure 5:
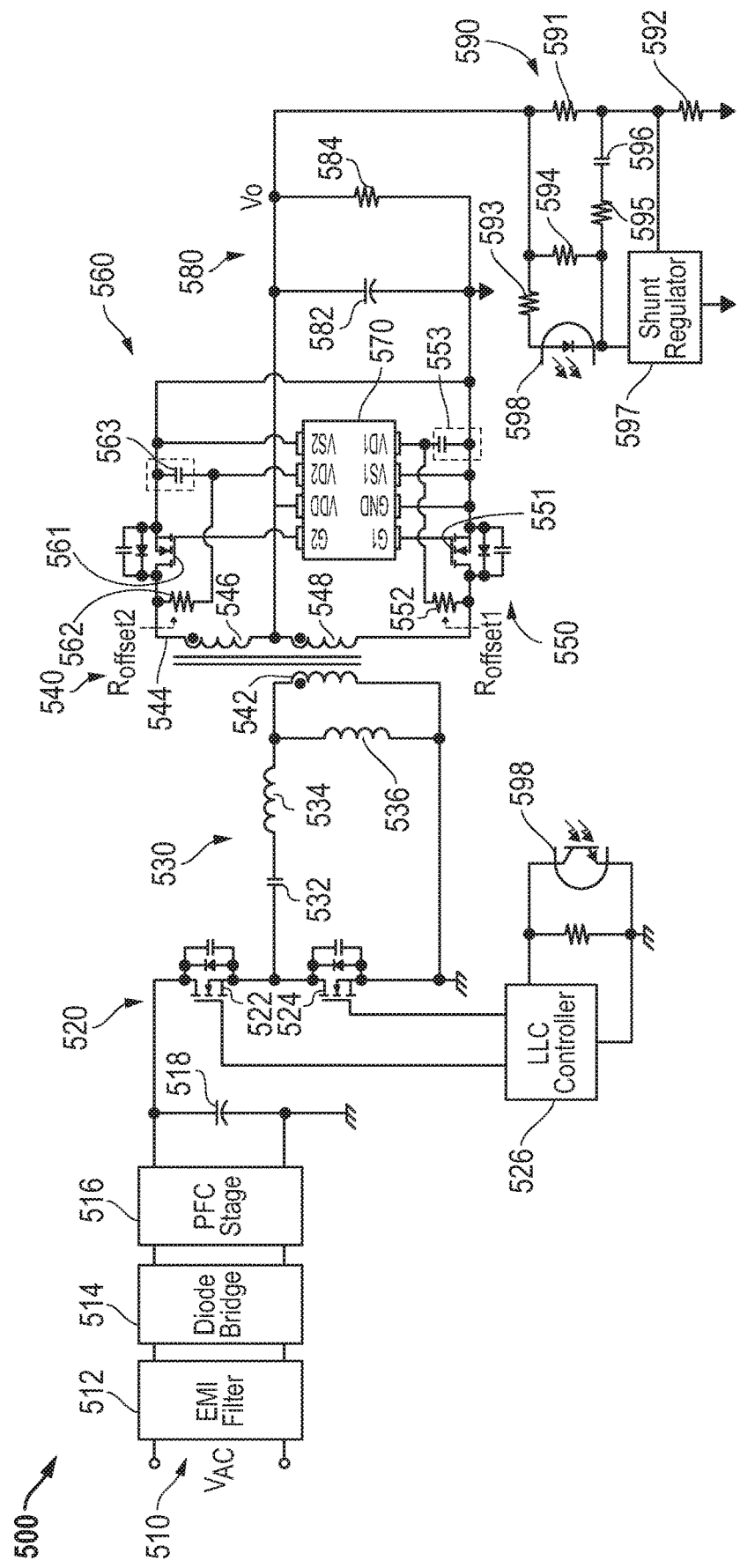
FIG. 5 illustrates in schematic form a switched mode power supply according to various embodiments.

FIG. 5 illustrates in schematic form a power converter 500 according to various embodiments. Power converter 500 includes generally an input section 510, a primary switching section 520, a resonant tank 530, a transformer 540, a first synchronous rectifier circuit 550, a second output section 560, a synchronous rectifier controller 570, an output section 580, and a feedback section 590.

Input section 510 includes an electromagnetic interference (EMI) filter 512, a diode bridge 514, a power factor correction (PFC) stage 516, and an input capacitor 518. EMI filter 512 has an input port for receiving an AC mains voltage labelled "$V_{AC}$", and an output port. Diode bridge 514 has an input port connected to the output port of EMI filter 512, and an output port. PFC stage 516 has an input port connected to the output port of diode bridge 514, and an output port having a first terminal and a second terminal connected to a primary ground. Capacitor 518 has a first terminal connected to the first terminal of the output port of PFC stage 516, and a second terminal connected to secondary ground.

Primary switching section 520 includes a high-side transistor 522, a low-side transistor 524, and an LLC controller 526. High-side transistor 522 is an N-channel MOSFET having a drain connected to the first terminal of the output port of PFC stage 516, a gate, a source, and a bulk terminal connected to the source thereof, and is shown with a body diode and a capacitor, each coupled between the source and drain. Low-side transistor 524 is an N-channel MOSFET having a drain connected to the source of high-side transistor 522, a gate, a source connected to primary ground, and a bulk terminal connected to the source thereof, each coupled between the source and drain. LLC controller 526 has a first input for receiving a feedback signal, a second input connected to primary ground, a first output connected to the gate of high-side transistor 522, and a second output connected to the gate of low-side transistor 524.

Resonant tank 530 includes a capacitor 532, an inductor 534, and an inductor 536. Capacitor 532 has a first terminal connected to the source of high-side transistor 522, and a second terminal. Inductor 534 has a first terminal connected to the second terminal of capacitor 532, a second terminal. Inductor 536 has a first terminal connected to the second terminal of inductor 534, a second terminal connected to primary ground, and may represent the magnetization inductance at the primary winding of transformer 540.

Transformer 540 has a primary winding 542, and a secondary winding 544 having a first segment 546 and a second segment 548. Primary winding 532 has a first end connected to the second terminal of inductor 534 and to the first terminal of inductor 536, and a second end connected to primary ground. First segment 546 has a first end, and a second end for providing an output voltage labeled "$V_O$". Second segment 548 has a first end connected to the second terminal of first segment 546, and a second end.

First synchronous rectifier circuit 550 includes a synchronous rectifier transistor 551, a resistor 552, and a capacitor 553. Synchronous rectifier 551 has a drain connected to the second end of second segment 548, a gate, and a source connected to a secondary ground, and is shown with a body diode and a capacitor, each coupled between the source and drain. Resistor 552 has a first terminal, a control terminal for receiving a signal labelled "$R_{OFFSET1}$", and a second terminal connected to the second end of second segment 548. Capacitor 553 has a first terminal connected to the first terminal of resistor 552, and a second terminal connected to secondary ground.

Second output section 560 includes a synchronous rectifier transistor 561, a resistor 562, and a capacitor 563. Synchronous rectifier 561 has a drain connected to the first end of first segment 546, a gate, and a source connected to a secondary ground, and is shown with a body diode and a capacitor, each coupled between the source and drain. Resistor 562 has a first terminal connected to the first end of first segment 546 and to the drain of synchronous rectifier transistor 561, a control terminal for receiving a signal labelled "$R_{OFFSET2}$", and a second terminal. Capacitor 563 has a first terminal connected to the first terminal of resistor 562, to the first end of first segment 546, and to the drain of synchronous rectifier transistor 561, and a second terminal connected to secondary ground.

Synchronous rectifier controller 570 in an integrated circuit controller having eight terminals, including a terminal labeled "G1" connected to the gate of synchronous rectifier transistor 551, a terminal labeled "GND" connected to secondary ground, a terminal labeled "VS1" connected to secondary ground, a terminal labeled "VD1" connected to the first terminals of resistor 552 and capacitor 553, a terminal labeled "VS2" connected to secondary ground, a terminal labeled "VD2" connected to the first terminals of resistor 562 and capacitor 563, a terminal labeled "VDD" connected to the center tap of the secondary winding of transformer 540 (and that may alternatively be connected to external power supply), and a terminal labeled "G2" connected to the gate of synchronous rectifier 561.

Output section 580 includes a capacitor 582 and a resistor 584. Capacitor 582 is an output capacitor having a first terminal connected to the center tap of the secondary winding, and a second terminal connected to secondary ground. Resistor 584 has a first terminal connected to the center tap of the secondary winding, and a second terminal connected to secondary ground, and represents the resistance of the load.

Feedback section 590 includes resistors 591, 592, 593, 594, and 595, a capacitor 596, a shunt regulator 597, an optocoupler 598, and a resistor 599. Resistor 591 has a first terminal connected to the center tap of the secondary winding of transformer 540, and a second terminal. Resistor 592 has a first terminal connected to the second terminal of resistor 591, and a second terminal connected to secondary ground. Resistor 593 has a first terminal connected to the center tap of the secondary winding of transformer 540, and a second terminal. Resistor 594 has a first terminal connected to the center tap of the secondary winding of transformer 540, and a second terminal. Resistor 595 has a first terminal connected to the second terminal of resistor 594, and a second terminal. Capacitor 596 has a first terminal connected to the second terminal of resistor 595, and a second terminal connected to the second terminal of resistor 591. Shunt regulator 597 has a first terminal connected to the second terminal of resistor 591, a second terminal, and a third terminal connected to secondary ground. Optocoupler 598 has a first input side terminal connected to the second terminal of resistor 593, a second input side terminal connected to the second terminal of resistor 594, a first output side terminal connected to the first input of LLC controller 526, and a second output side terminal connected to primary ground. Resistor 599 has a first terminal connected to the first input of LLC controller 526, and a second terminal connected to primary ground.

In operation, power converter 500 is an offline, inductor-inductor-capacitor (LLC) controller having two synchronous rectifier transistors 551 and 561 whose operation is controlled by synchronous rectifier controller 570 according to the techniques discussed herein. Input section 510 received an offline AC mains voltage $V_{AC}$ and converts it to a smoothed haversine waveform through diode bridge 514 and input capacitor 518. EMI filter 512 filters high frequency components that may interfere with other electronic devices close to power converter 500. Primary switching section 520 controls the delivery of energy to the primary winding of transformer 540, and LLC controller 526 controls the operating frequency with 50% duty cycle of current flow to the primary winding of transformer 540 according to an output voltage feedback signal received from optocoupler 598. Resonant tank 530 is a reactive circuit that stores energy when current is switched through primary winding 542, and delivers energy when current at other times, helping to maintain zero voltage switching and high efficiency. Transformer 540 has a center tapped secondary winding to provide output voltage $V_O$ using two output sections. Synchronous rectifier circuits 550 and 560 deliver power to output section 580 using respective synchronous rectifier transistors 551 and 561. Feedback section 590 forms a feedback signal that is passed over the isolation barrier using optocoupler 598.

Figure 6:
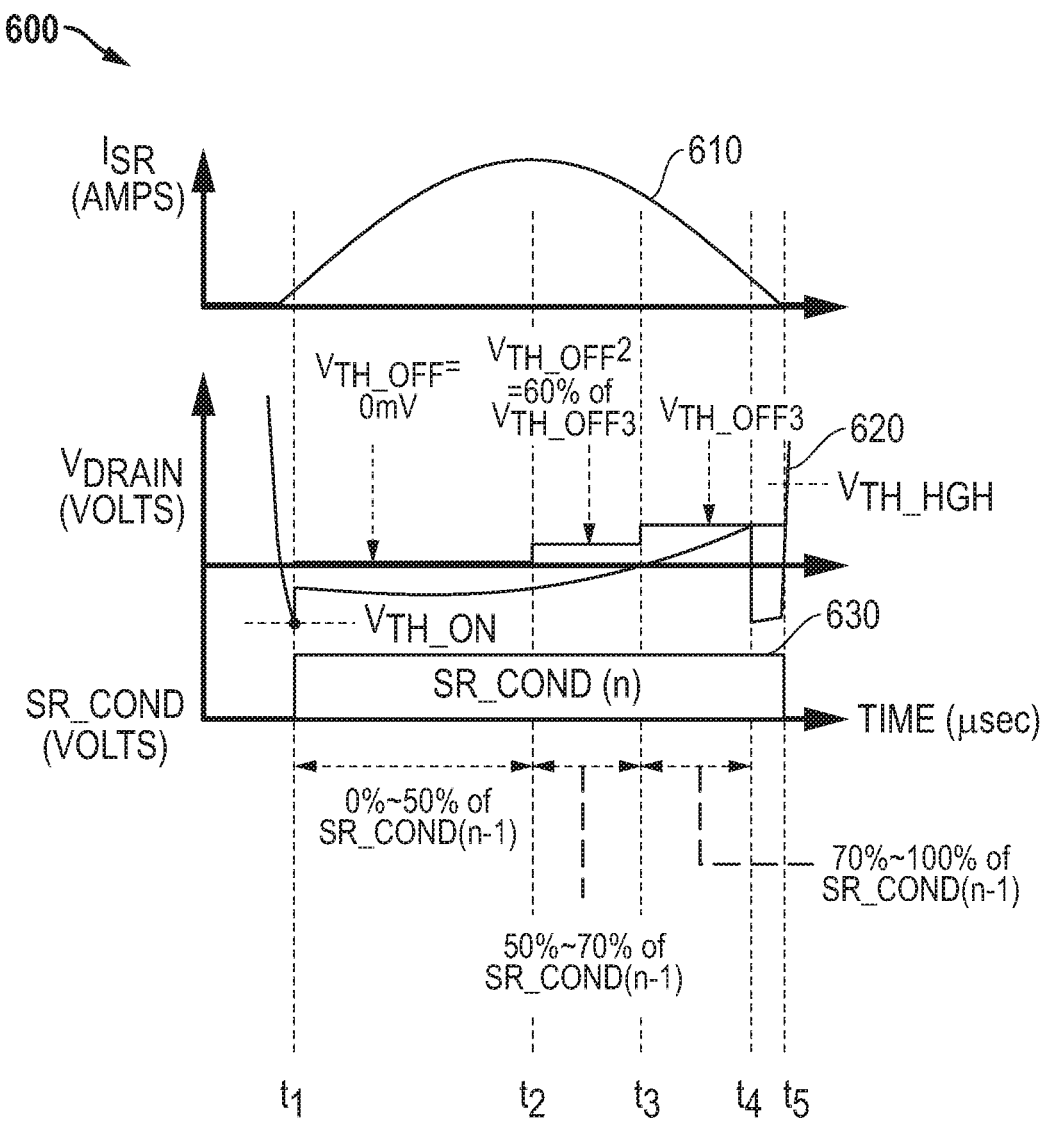
FIG. 6 illustrates a timing diagram showing the operation of the synchronous rectifier transistor of the switched mode power supply of FIG. 5.

It should be apparent that while the synchronous rectifier control techniques disclosed herein may be used with the exemplary LLC converter of FIG. 6, they may be used with other switched mode power supply architectures as well.

FIG. 6 illustrates a timing diagram showing the operation of synchronous rectifier transistor 551 of power converter 500 of FIG. 5. In timing diagram 600, the horizontal axis represents time in μsec, and the vertical axis represents the magnitude of certain signals in respective units. Timing diagram 600 illustrates a waveform 610 showing current $I_{SR}$ in amps, a waveform 620 showing drain voltage $V_{DRAIN}$ in volts, and a waveform 630 showing a signal labeled "SR_COND" in volts. Timing diagram 600 shows five time points of interest, $t_1$, $t_2$, $t_3$, $t_4$, and $t_5$.

SR_COND is a signal that is at a high voltage between the time when gate voltage G1 goes high ($t_1$) and the time that drain voltage $V_{DRAIN}$ would have exceeded a high threshold labeled "$V_{TH\_HGH}$" ($t_5$). Synchronous rectifier controller 570 uses a variable turn-off threshold that increases over an expected on-time of the gate voltage. In the embodiment shown in timing diagram 600, the variable turn-off threshold starts at a first value during a first portion of the expected on-time. The first value is labeled "$V_{TH\_OFF1}$" and is equal to 0 volts, and the first portion is from $t_1$ to $t_2$. The first portion establishes a minimum on time that can be, for example, from 0 to 50% of the time SR_COND was active during the previous cycle, labeled "SR_COND (n−1)".

The variable turn-off threshold is at a second value higher than the first value during a second portion of the expected on-time. The second value is labeled "$V_{TH\_OFF2}$" and can be, for example, 60% of a third value labeled "$V_{TH\_OFF3}$". The second portion of the expected on-time is subsequent to the first portion of the on-time and in this example is from $t_2$ to $t_3$. The second portion can be, for example, from 50% to 70% of SR_COND (n−1).

The variable turn-off threshold is at the third value, i.e. $V_{TH\_OFF3}$, higher than the second value during a third portion of the expected on-time. The third portion of the expected on-time is subsequent to the second portion of the on-time and in this example is from $t_3$ to $t_4$. The third portion can be, for example, from 70% to 100% of SR_COND (n−1). Between $t_4$ and $t_5$, synchronous rectifier controller 570 provides a dead time.

To prevent an unwanted turn-off (i.e. a mis-trigger) of the N-channel MOSFET transistor caused by noise, synchronous rectifier controller 570 adds a debounce time to the first portion. This debounce time is not added to the second and third portions.

By providing a variable threshold that increases over the cycle, synchronous rectifier controller 570 achieves both high efficiency and good transient response across all expected load ranges. Synchronous rectifier controller 570 is also robust enough to handle rapid changes in load (and therefore natural changes in the switching frequency).

Figure 7:
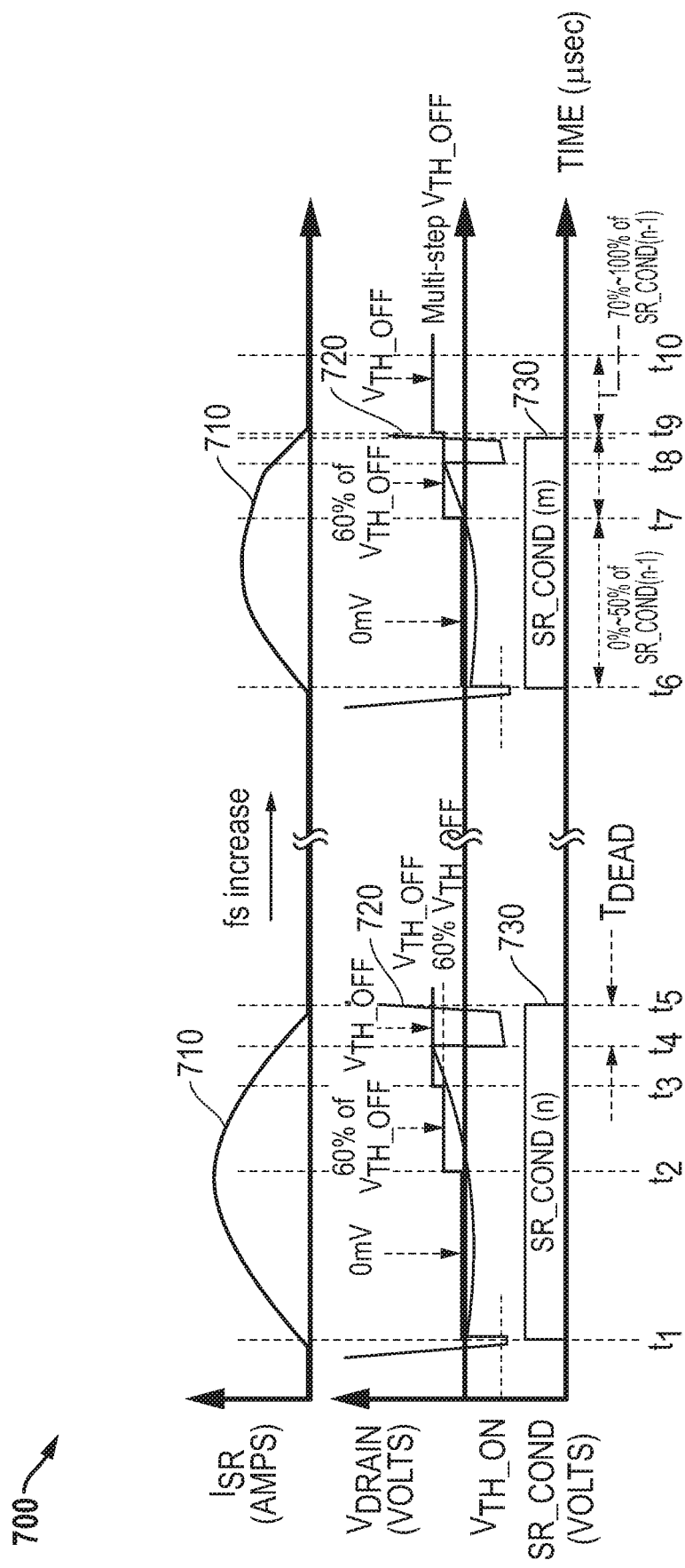
FIG. 7 illustrates a timing diagram showing the operation of the synchronous rectifier transistor of FIG. 5 with changing load conditions.

FIG. 7 illustrates a timing diagram 700 showing the operation of synchronous rectifier transistor 551 of FIG. 5 with changing load conditions. In timing diagram 700, the horizontal axis represents time in μsec, and the vertical axis represents the magnitude of various signals in respective units. Timing diagram 700 illustrates a waveform 710 showing current $I_{SR}$ in amps, a waveform 720 showing drain voltage $V_{DRAIN}$ in volts, and a waveform 730 showing signal SR_COND in volts. Timing diagram 700 shows five time points of interest, $t_1$, $t_2$, $t_3$, $t_4$, and $t_5$ associated with a first $(n-1)^{th}$ cycle corresponding to a first load condition, and a set of five time points labeled "$t_6$", "$t_7$", "$t_8$", "$t_9$", and "$t_{10}$" associated with a second $(n^{th})$ cycle corresponding to a second load condition. Waveform 710, waveform 720, and waveform 730 are substantially the same during the first cycle as corresponding waveforms shown in FIG. 6, with SR_COND indicating the time between the time when G1 goes high and the time that $V_{DRAIN}$ would have exceeded high threshold labeled $V_{TH\_HGH}$ for the prior (n−1) cycle.

Subsequent to $t_5$, however, the load lightens, and the natural switching frequency $f_S$ increases. Thus $I_{SR}$ waveform 710 has a smaller peak and a shorter cycle. However SR_COND reflects the time when G1 goes high and the time that $V_{DRAIN}$ would have exceeded high threshold labeled $V_{TH\_HGH}$ for the prior (n−1) cycle. As shown in FIG. 7, the primary side controller makes the primary side transistor non-conductive shortly before $t_6$, and the synchronous rectifier controller 570 activates N-channel MOSFET at time $t_6$. The dead time is the time between $t_8$ and $t_9$, and remains about the same proportion of the cycle as for the $(n-1)^{th}$ cycle. Unlike the $n^{th}$ cycle, however, the $V_{DRAIN}$ waveform reaches the threshold during the second step, when $V_{TH}$ is 60% of the $V_{TH\_OFF}$ level. Thus as the load lightens, the variable threshold ensures that the synchronous rectifier transistor turns off earlier in the cycle to maintain high efficiency without large transient currents.

Circuits that can be used to implement the various features will now be described.

Figure 8:
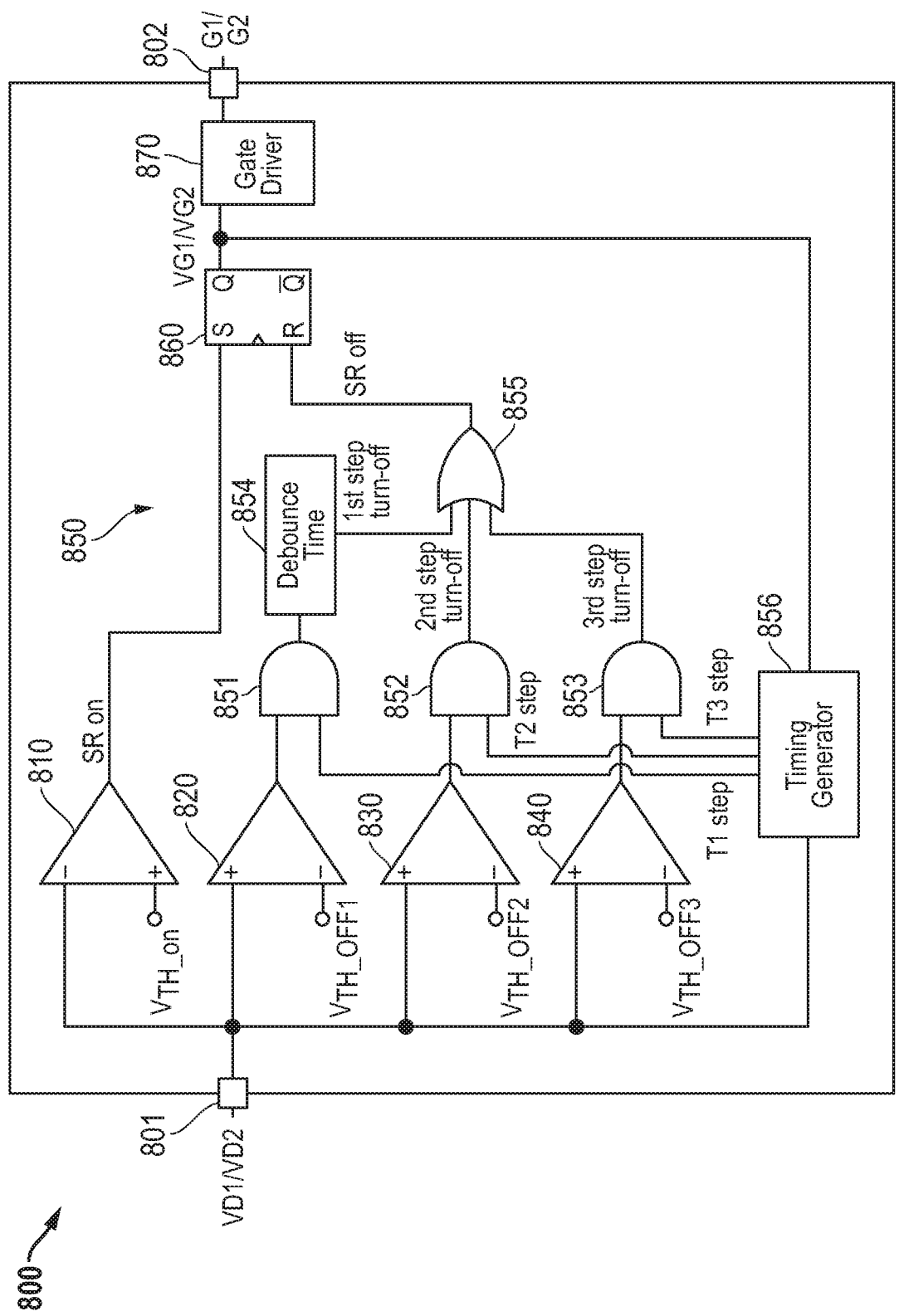
FIG. 8 illustrates in block diagram form a synchronous rectifier controller that can be used to implement the synchronous rectifier controller of FIG. 5.

FIG. 8 illustrates in block diagram form a synchronous rectifier controller 800 that can be used to implement synchronous rectifier controller 570 of FIG. 5. Synchronous rectifier controller 800 includes a drain input terminal 801 labeled "VD1/VD2", a gate output terminal 802 labeled "G1/G2", comparators 810, 820, 830, and 840, a timing circuit 850, a latch 860, and a gate driver 870. Comparator 810 has a positive input for receiving a turn-on threshold labeled "$V_{TH\_ON}$", a negative input terminal connected to drain input terminal 801, and an output terminal for providing a signal labeled "SR ON". Comparator 820 has a positive input connected to drain input terminal 801, a negative input terminal for receiving $V_{TH\_OFF1}$, and an output terminal. Comparator 830 has a positive input connected to drain input terminal 801, a negative input terminal for receiving $V_{TH\_OFF2}$, and an output terminal. Comparator 840 has a positive input connected to drain input terminal 801, a negative input terminal for receiving $V_{TH\_OFF3}$, and an output terminal.

Timing circuit 850 includes AND gates 851, 852, and 853, a debounce time circuit 854, an OR gate 855, and a timing generator 856. AND gate 851 has a first input connected to the output of comparator 820, a second input for receiving a signal labeled "T1STEP", and an output. AND gate 852 has a first input connected to the output of comparator 830, a second input for receiving a signal labeled "T2STEP", and an output. AND gate 853 has a first input connected to the output of comparator 840, a second input for receiving a signal labeled "T3STEP", and an output. Debounce time circuit 854 has an input connected to the output of AND gate 851, and an output. OR gate 855 has a first input connected to the output of debounce time circuit 854, a second input connected to the output of AND gate 852, a third input connected to the output of AND gate 853, and an output for providing a signal labeled "SR OFF". Timing generator 856 has a first input connected to terminal 801, a second input, a first output connected to the second input terminal of AND gate 851 for providing the T1STEP signal, a second output connected to the second input terminal of AND gate 852 for providing the T2STEP signal, and a third output connected to the second input terminal of AND gate 853 for providing the T3STEP signal.

Latch 860 has a set input labeled "S" connected to the output of comparator 810, a reset input labeled "R" connected to the output of OR gate 855, and an output labeled "Q" connected to the second input of timing generator 856 for providing a signal labeled "VG1/VG2". Gate driver 870 has an input connected to the output of latch 860, and an output connected to gate terminal 802. Synchronous rectifier controller 570 includes two circuits with the same construction, one for synchronous rectifier transistor 551 connected to terminals VD1 and G1, and one for synchronous rectifier transistor 561 connected to terminals VD2 and G2. The circuits in synchronous rectifier controller 800 are also connected to the VDD and GND terminals but these connections are not specifically shown in FIG. 8.

In operation, comparator 810 determines the activation time of the synchronous rectifier transistor as the time when the drain voltage falls below $V_{TH\_ON}$. When the drain voltage falls below $V_{TH\_ON}$, comparator 810 activates the SR ON signal, which sets latch 860 and causes gate driver 870 to drive signal G1 or G2 on gate terminal 802 to a voltage that makes the synchronous rectifier transistor conductive.

Synchronous rectifier controller 800 turns off the synchronous rectifier transistor as follows. Each of comparators 820, 830, and 840 activates their respective outputs when $V_{DRAIN}$ rises above the respective thresholds. Timing generator 856 determines the times when the respective thresholds are used. During the first portion of the cycle, for example 0-50% of the prior cycle, timing generator 856 activates T1STEP such that if $V_{DRAIN}$ rises above $V_{TH\_OFF1}$ while T1STEP is active (after a debounce time), then OR gate 855 activates the SR OFF signal, resetting latch 860 and causing driver 870 to deactivate the gate signal to make the synchronous rectifier transistor non-conductive. During a second portion of the cycle, for example 50-70% of the prior cycle, timing generator 856 activates T2STEP such that if $V_{DRAIN}$ rises above $V_{TH\_OFF2}$ while T2STEP is active, then OR gate 855 activates the SR OFF signal, resetting latch 860 and causing driver 870 to deactivate the gate signal to make the synchronous rectifier transistor non-conductive. During a third portion of the cycle, for example 70-100% of the prior cycle, timing generator 856 activates T3STEP such that if $V_{DRAIN}$ rises above $V_{TH\_OFF3}$ while T3STEP is active, then OR gate 855 activates the SR OFF signal, resetting latch 860 and causing driver 870 to deactivate the gate signal to make the synchronous rectifier transistor non-conductive.

Figure 9:
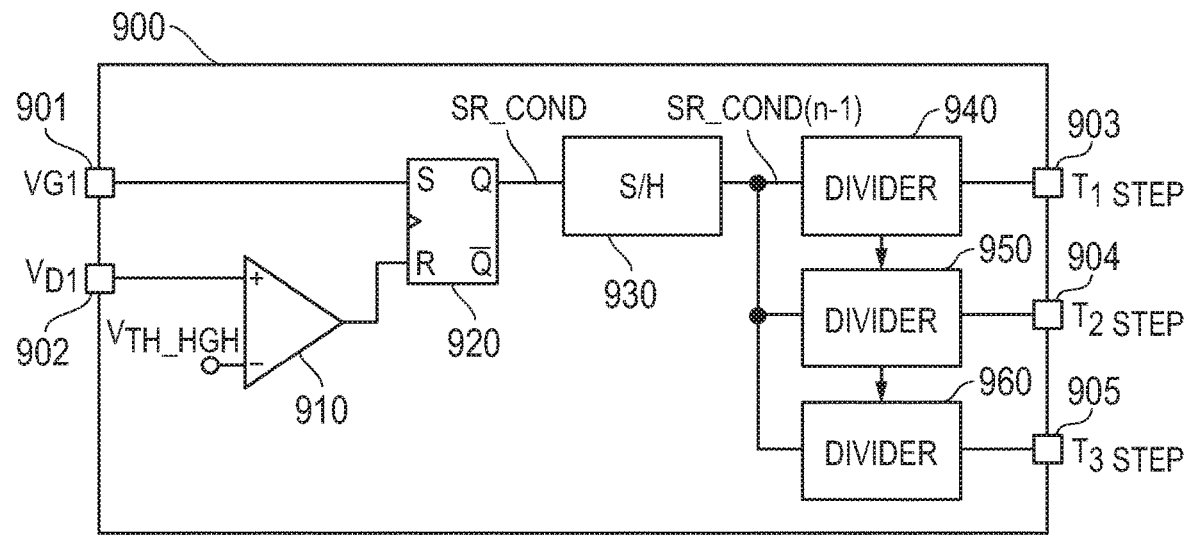
FIG. 9 illustrates in block diagram form a timing generator according to one embodiment of the timing generator of FIG. 8.

FIG. 9 illustrates in block diagram form a timing generator 900 according to one embodiment of timing generator 856 of FIG. 8. Timing generator 900 includes a terminal 901 for receiving the VG1 signal, a terminal 902 for receiving the VD1 signal, a terminal 903 for providing the T1STEP signal, a terminal 904 for providing the T2STEP signal, a terminal 905 for providing the T3STEP signal, a comparator 910, a latch 920, a sample and hold circuit 930 labeled "S/H", and dividers 940, 950, and 960. Comparator 910 has a positive input connected to terminal 902, a negative input for receiving the $V_{TH\_HGH}$ signal, and an output. Latch 920 has an S input connected to terminal 901, an R input connected to the output of comparator 910, and an output for providing the SR_COND signal. Sample and hold circuit 930 has an input connected to the Q output of latch 920, and an output for providing the SR_COND (n–1) signal. Divider 940 has an input connected to the output of sample and hold circuit 930, a first output connected to terminal 903, and a second output connected to terminal 903. Divider 950 has a first input connected to the output of sample and hold circuit 930, a second input connected to the second output of divider 940, a first output connected to terminal 904, and a second output. Divider 960 has a first input connected to the output of sample and hold circuit 930, a second input connected to the second output of divider 950, and an output connected to terminal 905.

In operation, the SR_COND signal is a signal that is at a high voltage between the time when VG1 goes high and the time that VD1 would have exceeded "$V_{TH\_HGH}$". An activation of signal VG1 sets latch 920 and establishes the start of SR_COND, and the point at which VD1 exceeds $V_{TH\_HGH}$ resets latch 920 and established the end of SR_COND. Sample and hold circuit 930 stores a value indicative of the length of time that SR_COND is active, and provides the SR_COND (n–1) signal to reflect the SR_COND waveform of the previous cycle. Dividers 940, 950, and 960 divide the period of SR_COND (n–1) into three portions that in the example discussed above correspond to 0-50% of SR_COND (n–1), 50-70% of SR_COND (n–1), and 70-100% or SR_COND (n–1).

The implementation of sample and hold circuit 930 and dividers 940, 950, and 960 can take a variety of forms. For example, sample and hold circuit 930 could integrate a fixed current source to store charge in a capacitor, in which the capacitor's voltage is proportional to the duration of SR_COND (n–1). Then each of dividers 940, 950, and 960 could use the sampled voltage to create the corresponding TSTEP waveform with the appropriate start timing and duration. For example, divider 940 could synchronize the start of the T1STEP waveform to the activation of VG1, and divide the voltage at the output of sample and hold circuit 930 by half and provide T1STEP with a duration that is half of SR_COND (n–1). Divider 950 can provide T2STEP with a duration of 20% of SR_COND (n–1) beginning at the deactivation of T1STEP indicated by the second output of divider 940. Likewise divider 960 can provide T3STEP with a duration of 30% of SR_COND (n–1) beginning at the deactivation of T2STEP indicated by the second output of divider 950. It should be apparent that this example is just one specific way of implementing the function of timing generator 856 of FIG. 8

Figure 10:
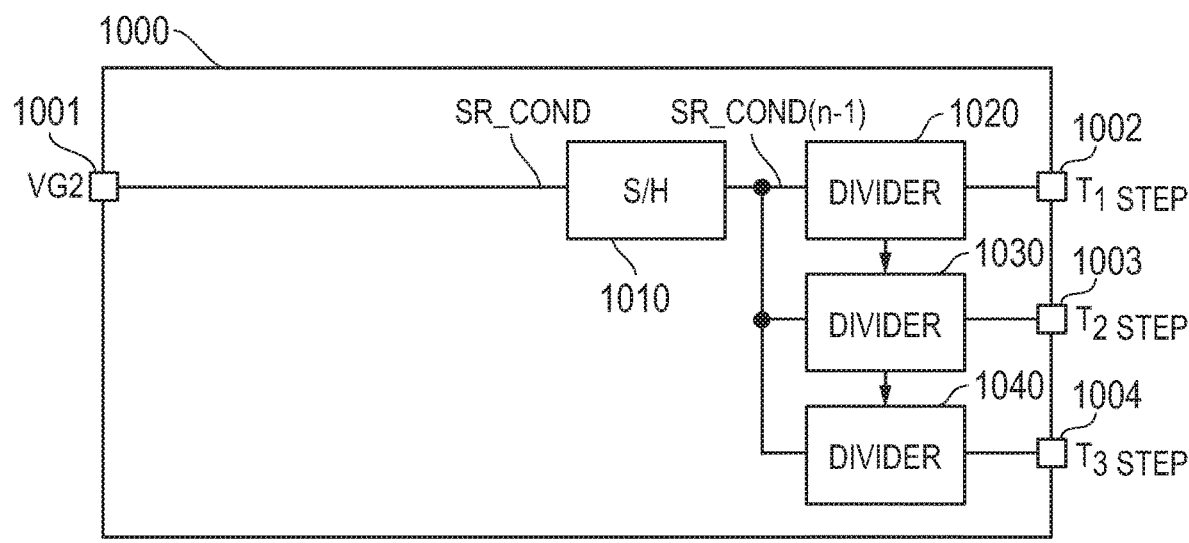
FIG. 10 illustrates in block diagram form another embodiment of a timing generator that can be used to implement the timing generator of FIG. 8.

FIG. 10 illustrates in block diagram form another embodiment of a timing generator 1000 according to another embodiment of timing generator 856 of FIG. 8. Timing generator 1000 includes a terminal 1001 for receiving the VG1 signal, a terminal 1002 for providing the T1STEP signal, a terminal 1003 for providing the T2STEP signal, a terminal 1004 for providing the T3STEP signal, a sample and hold circuit 1010, a divider 1020, a divider 1030, and a divider 1040. In this embodiment, the VG1 signal is used as a proxy for the SR_COND signal, and sample and hold circuit 1010 has an input connected to terminal 1001, and an output for providing the SR_COND (n–1) signal. Divider 1020 has an input connected to the output of sample and hold circuit 1010, a first output connected to terminal 1002, and a second output. Divider 1030 has a first input connected to the output of sample and hold circuit 1010, a second input connected to the second output of divider 1020, a first output connected to terminal 1003, and a second output. Divider 1040 has a first input connected to the output of sample and hold circuit 1010, a second input connected to the second output of divider 1030, and an output connected to terminal 1004.

Timing generator 1000 is similar to timing generator 900 except that it forms SR_COND using only the VG1 signal as the time from G1 high to G1 low. Since the dead time remains substantially constant between successive cycles and is only small fraction of the cycle time, forming SR_COND using only the gate voltage approximates operation using both the gate and drain voltages. Thus timing generator 1000 achieve a similar result as timing generator 900 but has a simplified circuit design.

Figure 11:
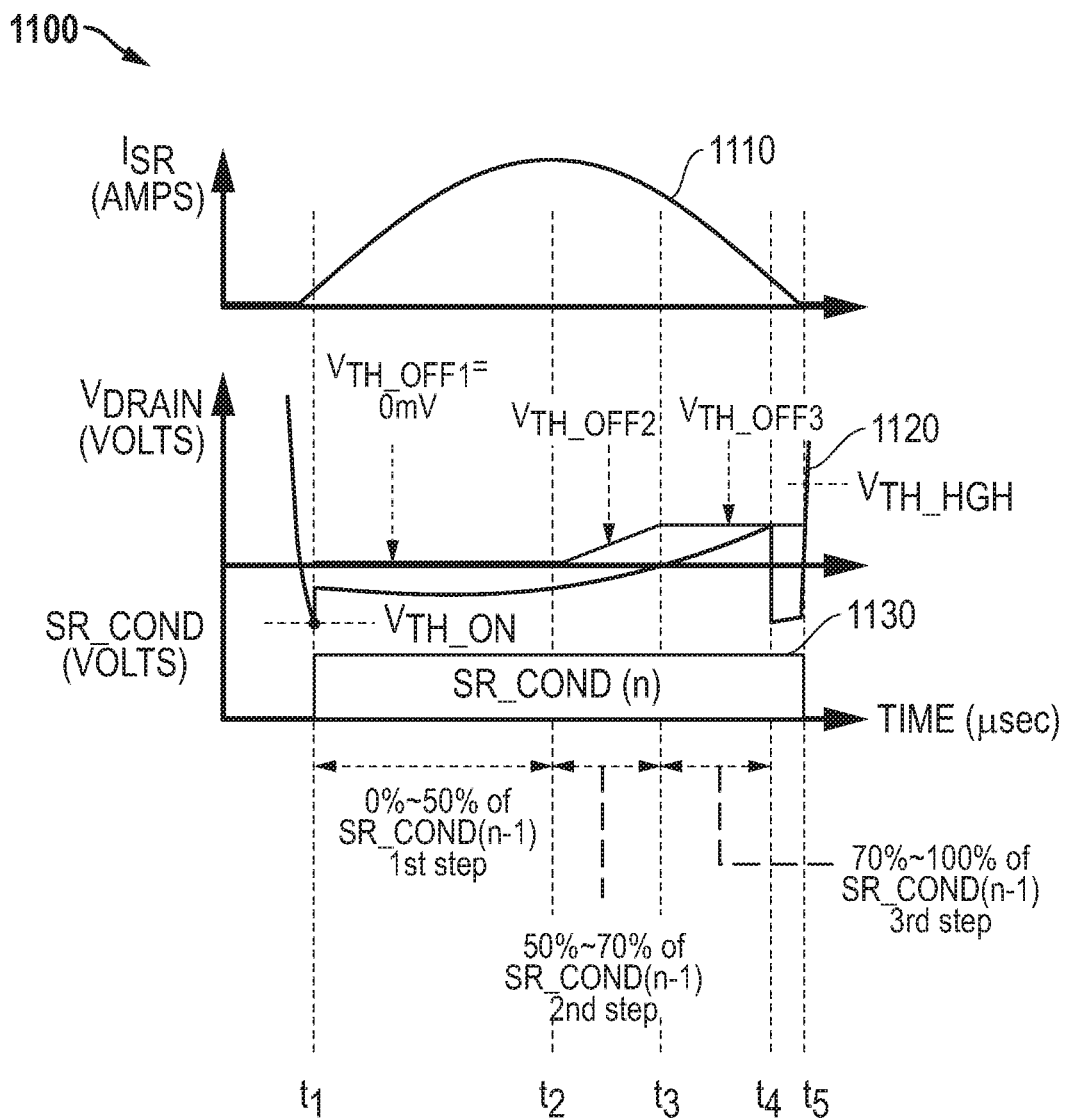
FIG. 11 illustrates a timing diagram showing the operation of another embodiment of the synchronous rectifier of FIG. 8.

FIG. 11 illustrates a timing diagram 1100 showing the operation of another embodiment of the synchronous rectifier of FIG. 8. Timing diagram 1100 is similar to timing diagram 600 except that in this embodiment, $V_{TH\_OFF2}$ is not a fixed value between the $V_{TH\_OFF1}$ and $V_{TH\_OFF3}$, but varies linearly between $V_{TH\_OFF1}$ and $V_{TH\_OFF3}$ over the second portion of the expected on time.

Figure 12:
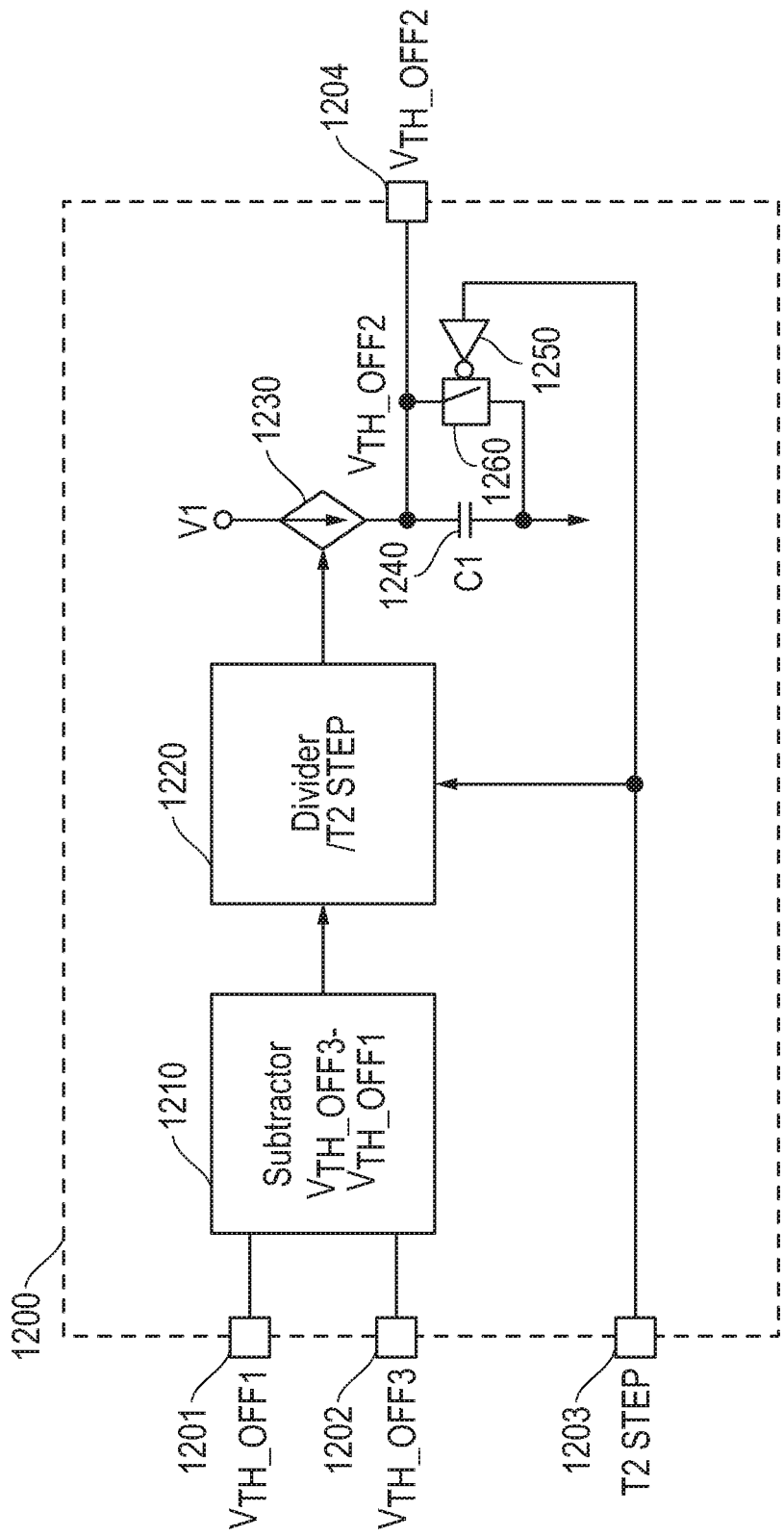
FIG. 12 illustrates in partial block diagram and partial schematic form a timing circuit that can be used to implement the operation of the timing diagram of FIG. 11.

FIG. 12 illustrates in partial block diagram and partial schematic form a timing circuit 1200 that can be used to implement the operation of the timing diagram of FIG. 11. Timing circuit 1200 includes a terminal 1201 for receiving $V_{TH\_OFF1}$, a terminal 1202 for receiving $V_{TH\_OFF3}$, a terminal 1203 for providing signal T2STEP, a terminal for providing $V_{TH\_OFF2}$, a subtractor 1210, a divider 1220, a current source 1230, a capacitor 1240, an inverter 1250, and a switch 1260. Subtractor has a first input connected to terminal 1201, a second input connected to terminal 1202, and an output for providing the difference between $V_{TH\_OFF3}$ and $V_{TH\_OFF1}$. Divider 1220 has a first input connected to the output of subtractor 1210, a second input for receiving the T2STEP signal, and an output for providing a value equal to $(V_{TH\_OFF3}-V_{TH\_OFF1})$/T2STEP. Current source 1230 has a first terminal for receiving a voltage labeled "V1", a second terminal connected to terminal 1204, and a control terminal connected to the output terminal of divider 1220. Capacitor 1240 has a first terminal connected to the second terminal of current source 1230, and a second terminal connected to ground. Inverter 1250 has a first terminal connected to terminal 1203, and an output. Switch 1260 has a first terminal connected to the first terminal of capacitor 1240, a second terminal connected to ground, and a control terminal connected to the output terminal of inverter 1250.

In operation, when T2STEP is low, capacitor 1240 is grounded, i.e. it stores the value of $V_{TH\_OFF1}$ when $V_{TH\_OFF1}=0$ volts. When T2STEP is high, capacitor 1240 integrates the current provided by current source 1230. Subtractor 1210 forms the difference between $V_{TH\_OFF3}$ received at terminal 1202 and $V_{TH\_OFF1}$ received at terminal 1201. Divider 1220 forms a value having a magnitude equal to $(V_{TH\_OFF3}-V_{TH\_OFF1})$/T2STEP. This voltage controls the current of variable current source 1230, which operates as an integrator and charges capacitor 1240. Thus the voltage on the first terminal of capacitor 1240, i.e. $V_{TH\_OFF2}$, rises from $V_{TH\_OFF1}$ to $V_{TH\_OFF2}$ linearly over the period defined by T2STEP.

In another embodiment in which $V_{TH\_OFF3}$ is not equal to 0 volts, the second terminal of capacitor 1240 would instead receive $V_{TH\_OFF1}$. When $V_{TH\_OFF3}$ is equal to 0 volts, subtractor 1210 can be omitted.

Thus, various embodiments of a switched mode power converter have been described. In one form, the power converter includes a synchronous rectifier controller that controls a synchronous rectifier transistor by increasing a turn-off threshold, in which the turn-off threshold increases over an expected on-time of the gate signal. In one example, the threshold can have a first during a first portion of the expected on-time, a second value higher than the first value during a second portion of the expected on-time subsequent to the first portion of the expected on-time, and a third value higher than the second value during a third portion of the expected on-time subsequent to the second portion of the expected on-time. In another example, the variable turn-off threshold has a first value during a first portion of the expected on-time, a third value higher than the first value during a third portion of the expected on-time, and a second value that varies between the first value and the third value during a second portion of the expected on-time subsequent to the first portion and before the third portion.

The above-disclosed subject matter is to be considered illustrative, and not restrictive, and the appended claims are intended to cover all such modifications, enhancements, and other embodiments that fall within the true scope of the claims. For example, the synchronous rectifier control method can be used in a variety of switched mode power supplies, including LLC, voltage mode flyback, synchronous rectifier (SR) flyback, and the like. Also while the examples shown above have used N-channel MOSFET transistors as the synchronous rectification element, other transistor types can be used in other embodiments. Moreover, other ways of increasing the turn-off threshold can be used, including more or fewer discrete steps, variable steps, etc.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A power converter comprising:
a transformer having a primary winding and a secondary winding;
a first primary side transistor coupled to said primary winding and having a gate for receiving a first primary gate signal, wherein said first primary side transistor causes said primary winding to conduct current selectively in response to said first primary gate signal;
a primary side controller having an input for receiving a voltage feedback signal, and an output that provides said first primary gate signal;
a first synchronous rectifier (SR) transistor having a drain coupled to said secondary winding, a gate for receiving a first SR gate signal, and a source coupled to a first output terminal of the power converter; and
a synchronous rectifier controller coupled to said gate and said drain of said first SR transistor, for activating said first SR gate signal when a voltage on said drain falls below a turn-on threshold, and deactivating said first SR gate signal when a voltage on said drain rises above a variable turn-off threshold, wherein said variable turn-off threshold increases over an expected on-time of said first SR gate signal, wherein said expected on-time begins at an activation of said first SR gate signal and continues for a period of time based on an on-time of said first SR gate signal of a previous cycle.

2. The power converter of claim 1, wherein said variable turn-off threshold:
has a first value during a first portion of said expected on-time;
has a second value higher than said first value during a second portion of said expected on-time subsequent to said first portion of said expected on-time; and
has a third value higher than said second value during a third portion of said expected on-time subsequent to said second portion of said expected on-time.

3. The power converter of claim 2, wherein:
said first value is approximately zero volts and said first portion of said expected on-time is approximately zero to fifty percent of said expected on-time;
said second value is approximately sixty percent of a final value and said second portion of said expected on-time is approximately fifty percent to seventy percent of said expected on-time; and
said third value is approximately said final value and said third portion of said expected on-time is approximately seventy percent to one hundred percent of said expected on-time.

4. The power converter of claim 2, wherein said SR controller comprises:

a first comparator having a negative input coupled to said drain of said first SR transistor, a positive input, and an output;

a latch having a set input coupled to said output of said first comparator, and an output; and a gate driver having an input coupled to said output of said latch, and an output for providing said first SR gate signal.

5. The power converter of claim 4, wherein said SR controller further comprises:

a second comparator having a positive input coupled to said drain of said first SR transistor, a negative input for receiving said first value, and an output;

a third comparator having a positive input coupled to said drain of said first SR transistor, a negative input for receiving said second value, and an output;

a fourth comparator having a positive input coupled to said drain of said first SR transistor, a negative input for receiving said third value, and an output; and a logic circuit coupled to said outputs of said second comparator, said third comparator, and said fourth comparator and having an output, wherein said logic circuit activates said output thereof if any of said outputs of said second comparator, said third comparator, and said fourth comparator are active during respective said first, second, and third portions of said expected on-time, wherein said latch further has a reset input coupled to said output of said logic circuit.

6. The power converter of claim 5, wherein said logic circuit comprises:

a first AND gate having a first input coupled to said output of said second comparator, a second input, and an output;

a second AND gate having a first input coupled to said output of said third comparator, a second input, and an output;

a third AND gate having a first input coupled to said output of said fourth comparator, a second input, and an output; and an OR gate having first, second, and third inputs coupled to said outputs of said first AND gate, said second AND gate, and said third AND gate, respectively, and an output coupled to said reset input of said latch.

7. The power converter of claim 6, wherein said logic circuit further comprises:

a debounce timer coupled between said output of said first AND gate, and said first input of said OR gate.

8. The power converter of claim 6, wherein said logic circuit further comprises:

a timing generator having a first input coupled to said drain of said first SR transistor, a second input coupled to the output of said latch, and first, second, and third outputs coupled to said second input of said first AND gate, said second AND gate, and said third AND gate, respectively.

9. The power converter of claim 1, wherein said variable turn-off threshold:

has a first value during a first portion of said expected on-time;

has a third value higher than said first value during a third portion of said expected on-time; and has a second value that varies between said first value and said third value during a second portion of said expected on-time subsequent to said first portion and before said third portion.

10. The power converter of claim 1, further comprising:

a second SR transistor having a drain coupled to said secondary winding, a gate receiving a second SR gate signal, and a source coupled to said first output terminal of the power converter, wherein said synchronous rectifier controller is coupled to said gate and said drain of said second SR transistor, for activating said second SR gate signal when a voltage on said drain of said second SR transistor falls below said turn-on threshold, and deactivating said second SR gate signal when a voltage on said drain of said second SR transistor rises above said variable turn-off threshold, wherein said variable turn-off threshold increases over a second expected on-time of said second SR gate signal, wherein said second expected on-time begins at an activation of said second SR gate signal and continues for a period of time based on an on-time of said second SR gate signal of a previous cycle.

11. The power converter of claim 10, wherein:

said secondary winding comprises a first end, a second end, and a center tap;

said first end is coupled to said drain of said first SR transistor;

said second end is coupled to said drain of said second SR transistor; and said center tap forms a second output terminal of the power converter.

12. The power converter of claim 1, wherein:

said expected on-time of said first SR gate signal is equal to a sum of said on-time of said first SR gate signal of said previous cycle and a dead time of said previous cycle.

13. The power converter of claim 12, wherein:

said on-time of said first SR gate signal of said previous cycle comprises a time between when said gate of said first SR transistor is active and when a voltage on said drain of said first SR transistor is above a high threshold.

14. A controller for use with a synchronous rectifier (SR) transistor having a drain, a gate, and a source, comprising:

a first comparator having a negative input adapted to be coupled to the drain of the SR transistor, a positive input, and an output;

a second comparator having a positive input adapted to be coupled to the drain of the SR transistor, a negative input for receiving a first value, and an output;

a third comparator having a positive input adapted to be coupled to the drain of the SR transistor, a negative input for receiving a second value, and an output;

a fourth comparator having a positive input adapted to be coupled to the drain of the SR transistor, a negative input for receiving a third value, and an output; and a logic circuit coupled to said outputs of said second comparator, said third comparator, and said fourth comparator and having an output, wherein said logic circuit activates said output thereof if said outputs of any of said second comparator, said third comparator, and said fourth comparator are active during respective first, second, and third portions of an expected on-time;

a latch having a set input coupled to said output of said first comparator, a reset input coupled to said output of said logic circuit, and an output; and a gate driver having an input coupled to said output of said latch, and an output adapted to be coupled to the gate of the SR transistor.

15. The controller of claim 14, further comprising:
a timing generator coupled to said logic circuit and having outputs for providing a first timing signal, a second timing signal, and a third timing signal corresponding to said first, second, and third portions, respectively, of said expected on-time.

16. The controller of claim 15, wherein:
said timing generator further has a first input coupled to the drain of the SR transistor, and a second input coupled to said output of said latch, and determines said first, second, and third portions of said expected on-time based on a time between when said output of said latch is active to when a voltage on the drain of the SR transistor is above a high threshold.

17. The controller of claim 15, wherein:
said timing generator has an input coupled to said output of said latch, and determines said first, second, and third portions of said expected on-time based on a time from when said output of said latch is active to when said output of said latch is inactive.

18. The controller of claim 15, wherein said timing generator further comprises:
a ramp circuit having a first input for receiving said first value, a second input for receiving said second value, a third input for receiving said second timing signal, and an output for providing said second value, wherein said ramp circuit varies said second value when between said first value and said third value when said second timing signal is active.

19. The controller of claim 15, wherein:
said first portion of said expected on-time is approximately zero to fifty percent of said expected on-time;
said second portion of said expected on-time is approximately fifty percent to seventy percent of said expected on-time; and
said third portion of said expected on-time is approximately seventy percent to one hundred percent of said expected on-time.

20. A method for power conversion using a synchronous rectifier (SR) transistor, comprising:
sensing a drain voltage on a drain of the SR transistor;
activating a gate signal to turn on the SR transistor in response to said drain voltage falling below a turn-on threshold; and
deactivating said gate signal when said drain voltage rises above a variable turn-off threshold, wherein said variable turn-off threshold increases over an expected on-time of said gate signal, wherein said expected on-time begins at an activation of said gate signal and continues for a period of time based on an on-time of a previous cycle.

21. The method of claim 20, further comprising:
coupling the SR transistor to a secondary winding of a transformer; and
driving a primary winding of said transformer according to a difference between an output voltage from said secondary winding and a desired voltage.

22. The method of claim 21, wherein driving said primary winding of said transformer comprises:
driving said primary winding through a resonant tank.

23. The method of claim 20, wherein said deactivating comprises:
generating said variable turn-off threshold at a first value during a first portion of said expected on-time;
generating said variable turn-off threshold at a second value during a second portion of said expected on-time subsequent to said first portion of said expected on-time; and
generating said variable turn-off threshold at a third value higher than said second value during a third portion of said expected on-time subsequent to said second portion of said expected on-time.

24. The method of claim 23, wherein said deactivating further comprises
generating said variable turn-off threshold at approximately zero volts during approximately zero to fifty percent of said expected on-time;
generating said variable turn-off threshold at approximately sixty percent of a final value during approximately fifty percent to seventy percent of said expected on-time; and
generating said variable turn-off threshold at approximately said final value during approximately seventy percent to one hundred percent of said expected on-time.

25. The method of claim 20, wherein said deactivating comprises:
generating said variable turn-off threshold at a first value during a first portion of said expected on-time;
generating said variable turn-off threshold at a third value higher than said first value during a third portion of said expected on-time; and
generating said variable turn-off threshold at a second value that varies between said first value and said third value during a second portion of said expected on-time subsequent to said first portion and before said third portion.

26. The method of claim 20, wherein:
said expected on-time of said gate signal is equal to a sum of said on-time of said previous cycle and a dead time of said previous cycle.

27. The method of claim 26, wherein:
said on-time of said gate signal of said previous cycle comprises a time between when said gate signal is active and when said drain voltage is above a high threshold.

* * * * *